United States Patent Office 2,773,810
Patented Dec. 11, 1956

2,773,810

HYDROFORMING CATALYST AND PROCESS

Charles N. Kimberlin, Jr., and Elroy M. Gladrow, Baton Rouge, La., assignors to Esso Research and Engineering Company, a corporation of Delaware No Drawing. Application October 31, 1952, Serial No. 318,067

8 Claims. (Cl. 196—50)

The present invention pertains to catalyst and particularly to the preparation of catalysts for use in the reforming or hydroforming of lower boiling hydrocarbons or naphtha fractions into motor fuels of excellent antiknock and engine cleanliness characteristics.

Hydroforming is a well-known process for treating hydrocarbon fractions boiling within the motor fuel or naphtha range to upgrade the same or increase the aromaticity and improve the engine cleanliness and antiknock characteristics of said fractions. It has been proposed to hydroform such fractions by treating them in the presence of hydrogen or hydrogen-rich recycle gas (i. e. at relatively high hydrogen partial pressure) at pressures up to about 1000 lbs. per sq. inch at temperatures of about 750–1050° F. and in contact with such catalyst as molybdenum oxide, chromium oxide or in general oxides of sulfides of metals of groups IV–VIII of the periodic system of elements, alone, or generally supported upon a base or spacing agent. Suitable materials for this purpose include activated alumina, alumina gel or the like. It has also been proposed to use zinc aluminate spinel as a base or support for hydroforming catalysts. A particular advantage of the zinc aluminate-spinel supported catalysts has been their improved stability to heat.

It is well known in several catalytic hydrocarbon conversions that catalysts having the same chemical compositions but prepared in different ways may differ widely in their ability to promote a certain reaction, or hydrocarbon conversion.

Previous experience with hydroforming catalysts has shown that the catalyst base or support exerts a strong influence on the utimate behavior or activity of the catalyst and that the method of preparing the base or support as well as the final catalyst composition has an important bearing upon the properties of the catalyst.

In addition to the improved stability exhibited by the above-mentioned zinc aluminate base hydroforming catalysts, such catalysts have also been found to have a particularly favorable selectivity pattern as shown by their ability to yield products of high aromatics content or low aniline point value. In spite of its good selectivity characteristics, the zinc aluminate spinel base catalysts have not been widely utilized because of the fact that these catalysts have a relatively low activity. Low activity is, of course, a serious defect in a catalyst since it lowers the capacity of a given reactor or necessitates the construction of larger reactors in order to achieve a given or desired throughput. Since hydroforming is normally carried out at pressures of about 50 to 400 lbs. per sq. inch, commercial sized installations require the use of steel reactor vessels upwards of three inches in thickness. Obviously such installations are costly to construct and maintain and must be operated at or near maximum throughput. Accordingly a catalyst such as the zinc aluminate spinel base catalysts are at a serious disadvantage in competition for use in such commercial installations because of the fact that their activity is somewhat lower than certain alumina-supported catalysts.

It is the object of this invention to prepare zinc aluminate base hydroforming catalysts of improved activity.

It is also the object of this invention to prepare zinc aluminate base catalysts of increased activity without adversely affecting the selectivity characteristics of said catalysts.

It is also the object of this invention to provide the art with an improved method for hydroforming motor fuel or naphtha fractions in contact with catalysts of high activity and with good selectivity to desirable components.

These and other objects will appear more clearly from the detailed specification and claims which follow.

It has now been found that superior zinc aluminate spinel base hydroforming catalysts can be prepared by hydrolyzing an aluminum alcoholate in the presence of a zinc salt, preferably a salt that is heat decomposable to zinc oxide such as zinc acetate, zinc formate, or zinc nitrate. Catalysts prepared in this particular way have been found to be much more active for hydroforming than other catalysts having the same nominal composition but prepared by different methods. That this outstanding activity is attributable to the particular method of preparation is believed to be further borne out by the fact that the surface area and pore volume of the catalysts prepared in accordance with the present invention are not appreciably different from catalysts of the same nominal composition prepared in other ways. If desired, a peptizing agent such as glacial acetic acid may be added to the aluminum alcoholate prior to the hydrolysis. Also, if desired, a stabilizing agent such as silica can be effectively incorporated in the base or catalyst composition by adding a silica hydrosol to the zinc salt solution used for hydrolyzing the alcoholate. The improved spinel base may be converted to hydroforming catalysts by the incorporation of a catalytic metal oxide such as molybdenum oxide, vanadium oxide, tungsten oxide or chromium oxide or metallic salts of molybdic acid such as calcium-, nickel- or cobalt molybdate or by the addition of small amounts of platinum or palladium.

According to the present invention, metallic aluminum is reacted with an alcohol to form aluminum alcoholate. For the present process the alcohol must be essentially anhydrous and may be soluble or insoluble in water. Alcohols that may be used in this process include ethyl, propyl, isopropyl, n-butyl alcohol, secondary butyl alcohol, isobutyl alcohol, pentanol-1, pentanol-2, 3-methyl butanol-1, 2-methyl butanol-3, pentanol-3, hexanol-1, hexanol-2, hexanol-3, the various methyl pentanols, the various dimethyl butanols, the various heptyl alcohols, the various octyl alcohols, etc. including those higher alcohols liquid at the temperature of operation of the process. Instead of using any one of the alcohols singly, mixed alcohols such as mixed amyl alcohols may be used. Mixtures of alcohols of different molecular weights may also be used.

In general, it is preferred to utilize water immiscible alcohols since this facilitates the recovery of the alcohol in anhydrous form for reuse in the preparation of aluminum alcoholate. In order to further facilitate the separation of the alcohol from the water when using a water-insoluble alcohol a hydrocarbon, such as a petroleum distillate boiling within the range of 200–500° F. or higher, preferably of narrow boiling range which includes the boiling range of the alcohol used, may be added to the alcohol. Instead of using a hydrocarbon fraction, selected hydrocarbons such as heptane, octane, toluene, xylene, etc., may be used. Although such addition of the hydrocarbon is not essential to the process, the use of the hydrocarbon diluent has the following advantages:

(1) The diluent aids in controlling the reaction of the alcohol and aluminum metal since a large amount of heat is liberated in the reaction and the hydrocarbon diluent aids in the dissipation of this heat;

(2) The hydrocarbon serves as a solvent for the solid aluminum alcoholate; and (3) The hydrocarbon diluent greatly aids in the separation and recovery of the alcohol from the metal oxide slurry after hydrolysis.

The metallic aluminum in the form of chips, shot, turnings, ingots or the like is reacted with the alcohol, preferably in the presence of a hydrocarbon diluent and in the presence of a suitable catalyst such as mercuric chloride or other mercury salts, iodine, aluminum halides or the like. The formation of the alcoholate takes place in accordance with the following equation:

Equation 1  $6ROH + 2Al \rightarrow 2Al(OR)_3 + 3H_2$

The hydrogen is in the gaseous state and escapes from the reaction mixture.

Upon mixing the aluminum alcoholate solution with an aqueous solution of a zinc salt, the aluminum alcoholate is hydrolysed with the formation of a precipitate comprising alumina and zinc. The interaction between the aluminum alcoholate or the alumina and the zinc salt is not fully understood. However, it is believed that the product comprises a hydrated form of zinc aluminate spinel which may be associated with the anionic component of the original zinc salt. This view is supported by the fact that the precipitate after careful drying gives an X-ray diffraction pattern similar to that of zinc aluminate spinel. It is believed that the overall hydrolysis may be described qualitatively by the following equation in which zinc acetate is used as the zinc salt:

$2Al(OR)_3 + Zn(C_2H_3O_2)_2 + H_2O \rightarrow$
$ZnAl_2O_4 \cdot 2HC_2H_3O_2 \cdot (water) + 6ROH$ In the above formula the acetic acid from the zinc acetate is shown as associated with the precipitated zinc aluminate spinel, although the actual degree of this association is not known. Although the above equation shows aluminum alcoholate and the zinc salt in stoichiometric proportions for the formation of zinc aluminate, in practice the amount of zinc salt used is such that the ultimate dried catalyst base will comprise 50 to 80% $Al_2O_3$ and 50 to 20% zinc oxide.

When using water insoluble alcohols the alcohol which is reformed or regenerated by the hydrolysis step together with the hydrocarbon diluent forms a layer separate and distinct from the slurry of hydrous aluminum oxide and zinc oxide and is easily recovered and removed by a simple process of decanting or the like. The slurry of metal oxides is removed for further treatment.

The water-insoluble alcohol-hydrocarbon diluent mixture contains a small amount of residual water as entrained or dissolved water and is freed from this residual water by a simple process of distillation for reuse in the process. The vapors passing overhead from the drying still are condensed, the condensate allowed to settle forming a water layer and an alcohol-hydrocarbon layer, the latter being recycled to the drying still. The anhydrous alcohol-hydrocarbon mixture is removed from the drying still and is ready for further reaction with additional metallic aluminum.

When using a water-soluble alcohol for reacting with aluminum to form the alcoholate, the alcohol reformed upon hydrolysis of the alcoholate goes into solution in the water and may be recovered by distillation. The recovered alcohol must then be dehydrated to anhydrous form in known manner before it is again used for reaction with additional metallic aluminum.

Instead of hydrolyzing the aluminum alcoholate in a solution of a heat decomposable zinc salt it is also possible to achieve essentially the same results by first dissolving aluminum alcoholate and a zinc compound such as zinc acetate in a solvent such as an alcohol to produce substantially a true homogeneous solution and then hydrolyzing said solution to produce a hydrous zinc-alumina composite. The solution of aluminum alcoholate and zinc compound may be made by separately dissolving the components and mixing these solutions, or the zinc compound may first be dissolved in alcohol and then aluminum metal may be dissolved in the resulting solution.

A base of outstanding stability can be prepared in accordance with the present invention by hydrolyzing the aluminum alcoholate in a solution of a heat decomposable zinc salt to which a silica hydrosol is added. The amount of silica hydrosol added may be varied as desired to provide from 0.5 to 10 wt. percent $SiO_2$, preferably 1 to 5 wt. percent $SiO_2$ in the zinc aluminate spinel base. The use of a silica hydrosol substantially free of dissolved ions, for example a sol prepared by contacting an alkali metal silicate with an acid regenerated cation exchange resin is especially desirable since this gives a product which requires no subsequent washing or other purification.

The hydrous zinc oxide-alumina composite produced in accordance with the present invention may be converted into a hydroforming catalyst by the addition of molybdenum oxide, vanadium oxide, tungsten oxide or chromium oxide, or metallic salts of molybdic acid such as calcium molybdate or cobalt molybdate or precious metals such as platinum or palladium. The incorporation of the catalytic component may be effected in any of a variety of ways well known to the art. For example, molybdenum oxide can be incorporated by slurrying molybdenum oxide with the hydrous zinc oxide-alumina composite or the latter may be dried and the molybdenum oxide sublimed thereon. Alternatively the molybdenum oxide may be incorporated by treating the zinc oxide-alumina composite with ammonium molybdate.

The amount of catalytic component added may be varied depending to a large degree upon the particular material used. For the most part the catalytic metal oxides or metallic salts of molybdic acid are applied in sufficient amount to give from about 5 to 20 wt. percent of the said component in the final composite although in the case of chromium oxide as much as 40 wt. percent may be incorporated. In the case of the precious metal catalysts about 0.1 to 2.0 wt. percent of platinum or about 0.5 to 5.0 wt. percent of palladium will suffice to give a catalyst of the desired activity. The dehydrogenating or active catalytic component may be added to the base either before or after the latter is dried. Drying of the hydrous zinc oxide-alumina composite may be carried out at temperatures between about 200 and 500° F. and it is ordinarily preferred to subject the catalyst to a calcination treatment or heating to temperatures of up to about 1200° to 1400° F. prior to use in a reforming or hydroforming process.

The catalysts prepared in accordance with the present invention can be used to considerable advantage in the reforming of petroleum naphtha and similar hydrocarbon mixtures containing appreciable quantities of naphthenes into high octane number motor fuels rich in aromatics. Depending upon reaction conditions, catalytic reforming operations are generally referred to as either hydroforming or aromatization reactions. By hydroforming is ordinarily meant an operation conducted at elevated temperatures and pressures in the presence of solid catalyst and hydrogen wherein the hydrocarbon fraction is increased in aromaticity and wherein there is no net consumption of hydrogen. The term aromatization refers to an operation in which the hydrocaron is treated in contact with solid catalyst, in the presence or absence of added hydrogen at elevated temperatures but at pressures near atmospheric pressures.

The feed stock to a reforming reaction may be a virgin naphtha, a cracked naphtha, a Fischer-Tropsch naphtha or the like having a boiling range of from about 125–450° F. or it may be a narrow boiling cut within this range. The feed stock is ordinarily preheated to about 800–1000° F. preferably about 950° F. before charging to the reforming reaction zone.

Recycle gas or hydrogen-rich process gas containing about 50 to 80 volume percent of hydrogen is circulated through the reaction zone to minimize carbon formation and to supply part of the heat of reaction. The recycle gas is preheated to temperatures of about 1050–1250° F. and circulated through the reaction zone at a rate of from about 1000 to 8000 cu. ft. per barrel of naphtha feed.

Contact of the naphtha with the catalyst may be effected in a fixed or moving bed or preferably in a fluidized solids reactor system. In the latter case the catalyst particles should, for the most part, be between 200 and 400 mesh in size or about 0–200 microns in diameter with a major proportion between 20 and 80 microns.

The reforming reaction zone is operated at temperatures between about 850 and 1050° F. and at pressures of from atmospheric to about 1000 lbs. per sq. inch, preferably at pressures below 250 lbs. per sq. inch. Small amounts of water vapor are present in the reaction zone due principally to the presence of water in the feed and the recycle gas and also due to the formation of water in the regeneration of the spent catalyst as well as the reduction of the regenerated catalyst. The presence of these small amounts of water (about 0.5 to 3.0 mol. percent) permits operation of the reaction zone at somewhat higher temperatures without loss in selectivity than is possible in systems lacking this small water partial pressure.

The regeneration of spent reactor catalyst in a fluidized solids system is effected at essentially the same pressure as is maintained in the reforming reaction zone and at temperatures of from about 1100–1200° F. The average residence time of the catalyst in the reaction zone is of the order of from about 3 to 4 hours while the average residence time of the catalyst in the regeneration zone is of the order of from about 3 to 15 minutes.

The weight ratio of catalyst to oil introduced into the reactor is about 0.5 to 3.5. It is ordinarily preferable to operate at catalyst to oil ratios of about 1.0 since higher ratios tend to give excessive carbon formation. Somewhat higher weight ratios can be used at higher temperatures.

Space velocity or weight in pounds of feed charged per hour per pound of catalyst in the reactor depends upon the age or activity level of the catalyst, the character of the feed stock and the desired octane number of the product. Space velocity for a catalyst comprising about 10 wt. percent molybdenum oxide upon a zinc aluminate spinel support prepared in accordance with the present invention may vary from about 1.5 w./h./w. to about 0.15 w./h./w.

The following examples are illustrative of the present invention:

EXAMPLE 1 (CATALYST A)

This example describes the production of a zinc aluminate spinel based hydroforming catalyst starting with zinc sulfate and sodium aluminate as has generally been customary heretofore. A solution of zinc sulfate is prepared by dissolving 161 lbs. of commercial zinc sulfate (anhydrous flakes) and 35 lbs. of sulfuric acid in water and diluting the solution to a volume of 100 gal. A solution of sodium aluminate is prepared by dissolving 164 lbs. of commercial sodium aluminate in water and diluting to 100 gal. and filtering. The two solutions are simultaneously poured into 25 gallons of water with agitation. There is formed a slurry of precipitated hydrous zinc aluminate spinel having a pH of about 8. The slurry is filtered and the filter cake is washed essentially free of by-product sodium sulfate by re-slurrying with water and refiltering four times using about 200 gallons of water for each re-slurrying operation. Finally the washed precipitate is re-slurried with a solution of 16 lbs. of ammonium molybdate dissolved in 16 gallons of water with sufficient additional water added to make a total of 130 gallons of slurry. This impregnated slurry is dried in a steam-heated oven at about 300° F. to give a dried product containing about 15% water. The dried catalyst was ground and compressed into 3/16" x 3/16" cylindrical pellets and activated at a temperature of 1200° F. for 6 hours prior to testing. This catalyst comprises 10% molybdena and about 90% zinc aluminate spinel. The yield is only about 66% of the theoretical based upon the amounts of the zinc sulfate and sodium aluminate starting materials because of losses encountered in the re-slurrying and filtering operations. This catalyst is designated hereinafter as Catalyst A.

EXAMPLE 2 (CATALYST B)

This example describes the production of a zinc aluminate spinel based catalyst by another prior art procedure. In this procedure aluminum alcoholate is converted to alumina hydrosol by hydrolysis with water in the presence of a peptizing agent. The alumina hydrosol is impregnated with a solution of zinc acetate and finally with a solution of ammonium molybdate containing an excess of ammonia. This procedure represents a considerable improvement over that described in Example 1. A solution of aluminum alcoholate is produced by dissolving 45 lbs. of aluminum metal turnings in 100 gallons of a mixture of equal volumes of Pentasol (mixed amyl alcohols) and a petroleum naphtha boiling in the range of 250° to 300° F. About 1/10 ounce of mercuric chloride is employed as a catalyst to promote the reaction between the aluminum metal and the amyl alcohol. To start the reaction between the aluminum and the alcohol it is necessary to heat the mixture to about 200° F.; but after the reaction is well started it is desirable to cool the mixture in order to keep the reaction under control. In order to produce an alumina hydrosol the above solution of aluminum alcoholate is hydrolysed by rapidly mixing with about 350 gallons of water containing about one gallon of acetic acid. The acetic acid serves as a peptizing agent. The bulk of the hydrocarbon and regenerated Pentasol separates from the hydrosol as an immiscible layer; this is decanted and dried for re-use. The small amount of hydrocarbon and Pentasol remaining in the hydrosol layer is separated by distillation. The alumina hydrosol remaining in the still contains about 26.3 lbs. of alumina per 100 gallons of hydrosol.

The alumina hydrosol produced from 45 lbs. of aluminum metal is mixed with 73 gallons of zinc acetate solution containing 153 lbs. of zinc acetate. The alumina sol containing zinc acetate is rapidly mixed with 185 gallons of ammonium molybdate solution containing 20.7 lbs. of ammonium molybdate and 28 lbs. of excess ammonia. The mixture sets to a soft jelly which is dried in a steam-heated oven at about 300° F. The dried product is ground, pelleted, and activated 6 hours at 1200° F. prior to testing. This catalyst comprises about 10% molybdenum oxide and about 90% zinc aluminate spinel. In this case, nearly a theoretical yield of finished catalyst is obtained. This catalyst is designated as Catalyst B.

EXAMPLE 3 (CATALYST C)

This and subsequent examples describe the production of zinc aluminate spinel based catalysts by the process of the present invention. In this process, anhydrous aluminum alcoholate solution is mixed with an aqueous solution of a zinc compound which, if desired, may also contain a promoter or stabilizer such as silica whereupon the aluminum alcoholate hydrolyses and interacts with the zinc compond to produce directly hydrous zinc aluminate spinel. In this procedure, the aluminum alcoholate is converted directly into the hydrous zinc aluminate spinel without the intermediate formation of an alumina hydrosol. This procedure has considerable advantage over the prior art procedures of Examples 1 and 2 both with respect to simplicity of operation and quality of the product.

An anhydrous solution of aluminum alcoholate is produced by dissolving 45 lbs. of aluminum metal in 100 gallons of a mixture of equal volumes of Pentasol and petroleum naphtha using a small amount of mercuric chloride catalyst as described in Example 2. The aluminum alcoholate solution is mixed in rapid succession with, first, a solution of one gallon of anhydrous acetic acid dissolved in 49 gallons of a mixture of equal volumes of Pentasol and petroleum naphtha and, second, a solution of 153 lbs. of zinc acetate dissolved in 200 gallons of water. The acetic acid serves as a peptizing agent and its use results in an improvement in the quality of the catalyst produced. After adding the acetic acid solution to the alcoholate solution, it is desirable to hydrolyse with the aqueous zinc comprising solution as soon as feasible thereafter, since the acetic acid causes a slow thickening and eventual gelling of the anhydrous aluminum alcoholate solution. The hydrolysis should be completed in less than five minutes, preferably less than one minute, after the addition of the acetic acid to the aluminum alcoholate solution. This is accomplished by conducting the two mixing operations continuously with the aid of two centrifugal pumps in series. The aluminum alcoholate solution and the anhydrous acetic acid solution are introduced by separate lines in the volumetric ratio of 2:1, respectively, into the impeller zone of the first pump; the discharge from the first pump and the aqueous zinc acetate solution are introduced by separate lines in the volumetric ratio of 3/4, respectively, into the impeller zone of the second centrifugal pump. The discharge from the second pump separates into an upper alcohol-hydrocarbon phase and a lower aqueous phase comprising a slurry of hydrous zinc aluminate spinel. The alcohol-hydrocarbon phase is recovered and dried for re-use. The small amount of alcohol and hydrocarbon remaining in the aqueous phase is removed by stripping with steam. A solution of 20.7 lbs. of ammonium molybdate dissolved in 10 gallons of water is added to the slurry of zinc aluminate spinel and the mixture is dried at about 300° F. The dried catalyst is ground, pelleted and activated for six hours at 1200° F. prior to testing. This catalyst comprises about 10% molybdenum oxide and about 90% zinc aluminate spinel. Nearly a theoretical yield of catalyst is obtained. This catalyst is designated as Catalyst C.

EXAMPLE 4 (CATALYST D)

In this and succeeding examples the method of catalyst preparation is essentially the same as that described in Example 3 except that silica hydrosol is added to the solution of zinc salt used in the hydrolysis of the aluminum alcoholate.

A soda free silica hydrosol comprising about 3% silica is produced by diluting sodium silicate ($Na_2O \cdot 3.25SiO_2$) solution of specific gravity 1.21 with 5.4 times its volume of water and percolating the diluted solution through a bed of acid regenerated Amberlite IR–120 cation exchange resin having a depth of about 3½ feet at a rate of about 1.35 gallons of dilute sodium silicate solution per square foot cross sectional area of the exchange bed. A total of about 25 gallons of silica hydrosol per cubic foot of resin is produced before it becomes necessary to regenerate the resin. To regenerate the resin it is first washed with about twice its volume of water and then treated with 5% sulfuric acid using about 20 gallons of 5% acid per cubic foot of resin. The regenerated resin is washed free of sulfuric acid with water prior to re-use for making more silica sol. Amberlite IR–120 is believed to comprise a sulfonated phenol-aldehyde condensation polymer, however, other types of cation exchange resins such as sulfonated polystyrene, sulfonated coal, etc., may be employed if desired.

An aluminum alcoholate solution obtained by dissolving 45 lbs. of aluminum metal in 100 gallons of Pentasol-petroleum naphtha mixture as in Example 2 is mixed in rapid succession with (1) 1 gallon of anhydrous acetic acid dissolved in 49 gallons of Pentasol-petroleum naphtha mixture and (2) a solution of 153 lbs. of zinc acetate dissolved in 190 gallons of water to which 10 gallons of silica hydrosol comprising about 3% silica is added. The slurry of hydrous zinc aluminate spinel containing silica is separated from the regenerated alcohol hydrocarbon mixture as in Example 3. A solution of 21 lbs. of ammonium molybdate dissolved in 10 gallons of water is added to the slurry and the mixture is dried at about 300° F. The dried catalyst is ground, pelleted, and activated 6 hours at 1200° F. before testing. This catalyst comprises about 10% molybdenum oxide, about 1.5% silica, and about 88.5% zinc aluminate spinel. This catalyst is designated Catalyst D.

EXAMPLE 5 (CATALYST E)

This catalyst is prepared in exactly the same manner as in Example 4 except that the amount of silica hydrosol added to the zinc acetate solution is increased from 10 gallons to 31 gallons and the amount of ammonium molybdate is increased from 21 lbs. to about 21.8 lbs. The resulting catalyst comprises about 10% molybdenum oxide, about 4.4% silica and about 85.6% zinc aluminate spinel. This catalyst is designated Catalyst E.

EXAMPLE 6 (CATALYST F)

This catalyst is prepared in exactly the same manner as in Example 4 except that the amount of silica hydrosol added to the zinc acetate solution is increased from 10 gallons to 93 gallons and the amount of ammonium molybdate is increased from 21 lbs. to 23.8 lbs. The resulting catalyst comprises about 10% molybdenum oxide, about 11.8% silica and about 78.2% zinc aluminate spinel. This catalyst is designated Catalyst F.

Each of the Catalysts A, B and C was tested in a catalyst testing unit using the same feed stock and reactor conditions. The feed stock was a 200–330° F. virgin naphtha from mixed Texas crudes. The reactor was maintained at 900° F. and 50 lbs. per sq. inch. The naphtha feed was at the rate of 1 v./v./hr. and 1500 cu. ft. of hydrogen were circulated through the reactor per barrel of feed. The reactor was operated on a 3 hour cycle. The surface area and pore volume of the catalysts and the results obtained on the reforming test runs are summarized in Table I.

*Table I*

| Catalyst | A | B | C |
| --- | --- | --- | --- |
| Surface Area, M.²/g | 100 | 135 | 109 |
| Pore Volume, cc/g | 0.20 | 0.30 | 0.32 |
| Product Distribution: | | | |
|   C₆+, Vol. percent | 84.4 | 76.3 | 76.4 |
|   Gas, Wt. percent | 9.1 | 14.2 | 13.7 |
|   Carbon, percent | 0.9 | 1.1 | 1.4 |
| C₆+ Quality: | | | |
|   Aniline Point, °F | 49 | 22 | 9 |
|   °API Gravity | 45.5 | 42.7 | 41.7 |

The above data attest the high activity of Catalyst C as evidenced by the low aniline point and API gravity of the liquid product. Since the composition, surface area and pore volume of Catalyst C is substantially the same as that of Catalysts A and B, it appears clear that the improved activity of Catalyst C must arise from its method of preparation.

Table II shows the yield of C₆+ product obtained and the feed rate required at 900° F., 50 p. s. i. g. pressure, and 1500 cu. ft. of hydrogen per barrel of feed when producing a C₆+ product having a zero aniline point.

Table II

| Catalyst | A | B | C |
|---|---|---|---|
| C₆+ Aniline Point, °F | 0 | 0 | 0 |
| Feed Rate, v./v./hr | 0.32 | 0.51 | 0.90 |
| C₆+ Yield, vol. percent | 74.5 | 72 | 75 |

The above data show that Catalyst C prepared by the process of the present invention is also highly selective for the formation of high yields of C₆+ product having a low aniline point value. The above data also further illustrate the high activity of Catalyst C.

In order to show the effect of silica stabilizer on the quality of catalysts prepared according to the present process, Catalysts C, D, E, and F were tested at 900° F., 50 p. s. i. g. pressure, 1500 cu. ft. of hydrogen per barrel of feed at a feed rate of 1 v./v./hr. using the same naphtha feed as in the above-described tests. The results obtained are summarized in the following table.

Table III

| Catalyst | C | D | E | F |
|---|---|---|---|---|
| Percent SiO₂ Stabilizer | 0 | 1.5 | 4.4 | 11.8 |
| Surface Area, M.²/g | 109 | 146 | 172 | 149 |
| Pore Volume cc./g | 0.32 | 0.28 | 0.29 | 0.30 |
| Product Distribution: | | | | |
| C₆+, Vol. percent | 76.4 | 80 | 76.8 | 76.9 |
| Gas, Wt. percent | 13.7 | 13.8 | 13.4 | 12.8 |
| Carbon, percent | 1.4 | 1.0 | 1.4 | 1.8 |
| C₆+ Quality: | | | | |
| Aniline Point, °F | 9 | 5 | 12 | 38 |
| °API Gravity | 41.7 | 41.4 | 41.6 | 43.4 |

The data presented in Table III show that the addition of silica results in an increased surface area. In small amounts, silica also improves catalyst activity and selectivity for the production of C₆+ material.

These data show that the catalysts prepared in accordance with the present invention (C, D, E and F) are considerably more active than conventional zinc aluminate spinel based catalysts (A and B). The incorporation of small amounts of silica serves to increase the surface area compared to the silica-free preparations. Considerable improvement in selectivity to C₆+ and coke is noted in the case of Catalyst D, comprising 1.5% SiO₂. The results with 4.4% SiO₂ stabilized catalyst appear to stand off with the silica-free Catalyst C. The addition of 11.8% SiO₂ renders the Catalyst F inferior to Catalysts C, D and E, although it is still somewhat superior to a conventional catalyst of this type (A).

The foregoing description contains a limited number of embodiments of the present invention. It will be understood, however, that this invention is not limited thereto since numerous variations are possible without departing from the scope of this invention.

What is claimed is:

1. An improved hydroforming catalyst prepared by reacting aluminum with an anhydrous alcohol diluted with a hydrocarbon diluent to obtain an anhydrous aluminum alcoholate, admixing said alcoholate with an anhydrous peptizing agent and an aqueous solution of a heat decomposable zinc salt to obtain a slurry comprising a hydrous zinc-aluminum oxide complex, incorporating a hydroforming catalyst component with said complex, and drying the resulting composition.

2. The catalyst of claim 1 wherein said hydroforming catalyst component comprises a compound selected from the group consisting of molybdenum oxide, tungsten oxide, chromium oxide, ammonium molybdate, calcium molybdate, cobalt molybdate, platinum, palladium and mixtures thereof, said complex comprises from 50 to 80% Al₂O₃ and from 50 to 20% zinc oxide, and said composition comprises from 5 to 20 wt. percent of said hydroforming catalyst component in the case of oxides and molybdates, and from 0.5 to 5.0 wt. percent in the case of platinum and palladium.

3. An improved hydroforming catalyst prepared by rapidly admixing anhydrous aluminum amylate diluted with a petroleum naphtha diluent with anhydrous acetic acid and a zinc acetate solution to obtain a slurry comprising a zinc-aluminum oxide complex, recovering amyl alcohol and said diluent from said slurry, mixing an ammonium molybdate solution with said complex, and drying and activating the resulting composition, the amount of ingredients used being such that said complex comprises from 50 to 80% Al₂O₃ and 50 to 20% zinc oxide, and said composition comprises from 5 to 20 wt. percent of molybdenum oxide.

4. The catalyst of claim 3 wherein said zinc acetate solution contains silica hydrosol, prepared by contacting an alkali metal silicate with an acid regenerated cation exchange resin, in amounts sufficient such that said complex contains from 1 to 5 wt. percent SiO₂.

5. An improved process for preparing a hydroforming catalyst which comprises rapidly admixing anhydrous aluminum alcoholate with an aqueous solution of a heat decomposible zinc compound to obtain a slurry comprising zinc-aluminate spinel, incorporating a hydroforming catalyst component into said spinel and drying the resulting composition.

6. A process for preparing a hydrocarbon hydroforming catalyst which comprises the steps of forming an anhydrous alcoholate of aluminum diluted with a hydrocarbon diluent, rapidly hydrolyzing said alcoholate in the presence of a peptizing agent by mixing with an aqueous solution of a heat decomposible zinc compound to form a slurry comprising a hydrous zinc-aluminum oxide complex, incorporating a hydroforming catalyst component into said complex, and drying the resulting composition.

7. The process of claim 6 wherein said catalytic component comprises a compound of molybdenum, and is incorporated by mixing said complex with an aqueous solution of said hydroforming catalyst component.

8. A method of hydroforming hydrocarbons which comprises contacting said hydrocarbons in the presence of free hydrogen under hydroforming conditions with a catalyst prepared by forming an anhydrous alcoholate of aluminum diluted with a hydrocarbon diluent, rapidly hydrolyzing said alcoholate in the presence of a peptizing agent by mixing with an aqueous solution of a heat decomposible zinc compound to form a slurry comprising a hydrous zinc-aluminum oxide complex, incorporating a hydroforming catalyst component into said complex, and drying the resulting composition.

References Cited in the file of this patent

UNITED STATES PATENTS

| | | |
|---|---|---|
| 2,337,421 | Spence et al. | Dec. 21, 1943 |
| 2,447,016 | Kearby | Aug. 17, 1948 |
| 2,474,213 | Black | June 28, 1949 |
| 2,556,280 | Kearby | June 12, 1951 |
| 2,623,020 | Gilbert | Dec. 23, 1952 |
| 2,636,865 | Kimberlin | Apr. 28, 1953 |